United States Patent [19]

Hanihara

[11] Patent Number: 5,430,756
[45] Date of Patent: Jul. 4, 1995

[54] SOLID STATE LASER EXCITED BY LASER DIODE

[75] Inventor: Sadamasa Hanihara, Tokyo, Japan

[73] Assignee: NEC Corporation, Tokyo, Japan

[21] Appl. No.: 286,515

[22] Filed: Aug. 5, 1994

[30] Foreign Application Priority Data

Aug. 5, 1993 [JP] Japan .................. 5-193789

[51] Int. Cl.⁶ .............................................. H01S 3/08
[52] U.S. Cl. ................................. 372/108; 372/107; 372/98; 372/21; 372/34
[58] Field of Search .............. 372/108, 107, 92, 98, 372/21, 34

[56] References Cited

U.S. PATENT DOCUMENTS 5,187,714  2/1993  Okazaki et al. ................ 372/34

Primary Examiner—Léon Scott, Jr.
Attorney, Agent, or Firm—Sughrue, Mion, Zinn, Macpeak & Seas

[57] ABSTRACT

A hollow member or an envelope 7 housing a laser medium 3 having a reflective coating 31 on one surface thereof, a non-linear optical crystal 4 and an output mirror 5 having a reflective coating 51 on one surface thereof has a thin-walled portion 71 in its center portion. The air-tightly sealed envelope 7 is evacuated through an exhausting pipe 9 and, after sealing the pipe 9, a laser resonator unit 70 is obtained. By arranging a laser diode unit 10 on the reflective coating 31 of the laser medium 3 and integrating it by a connecting member 17, a long life-time, compact solid state laser excited by laser diode is obtained.

10 Claims, 1 Drawing Sheet

SOLID STATE LASER EXCITED BY LASER DIODE

BACKGROUND OF THE INVENTION

The present invention relates to a solid state laser having a laser diode as its light source for excitation and, particularly, to a compact solid state laser resonator having a non-linear optical crystal therein.

U.S. Pat. No. 4,942,582 issued on Jul. 17, 1990 to Kintz et al. discloses a basic construction of conventional solid state laser excited by a laser diode. In the solid state laser, a laser resonator is constituted with an output mirror and a laser medium. The outside surface of the laser medium is coated with a reflective film. When the laser medium is optically excited by an output light from the laser diode, a newly excited fundamental wavelength of the laser medium is amplified by the laser resonator and emitted from the output mirror. Generation of second harmonic of the fundamental wavelength is achieved by arranging a non-linear optical crystal such as TKP between the laser medium and the output mirror.

However, the laser medium and the non-linear optical crystal may degrade laser oscillation efficiency when temperature increases. Further, since organic optical crystal may be deliquescent, its characteristics is varied considerably with time when used under atmospheric condition and its life is very short.

SUMMARY OF THE INVENTION

An object of the present invention is to provide a solid state laser having a compact tightly sealed laser resonator for elongating a life-time of the non-linear optical crystal.

According to the present invention, a solid state laser comprises a laser diode unit and a laser resonator unit. The laser resonator unit has a hollow member or a envelope for integrating air-tightly a laser medium, the non-linear optical crystal and an output mirror. The envelope has a thin-wall at center portion and, by evacuating the integrated envelope, the thin-walled center portion is deformed to make these elements arranged in the envelope in intimate contact with each other to thereby provide a compact laser resonator unit.

DESCRIPTION OF THE PREFERRED EMBODIMENTS

Figure 1:
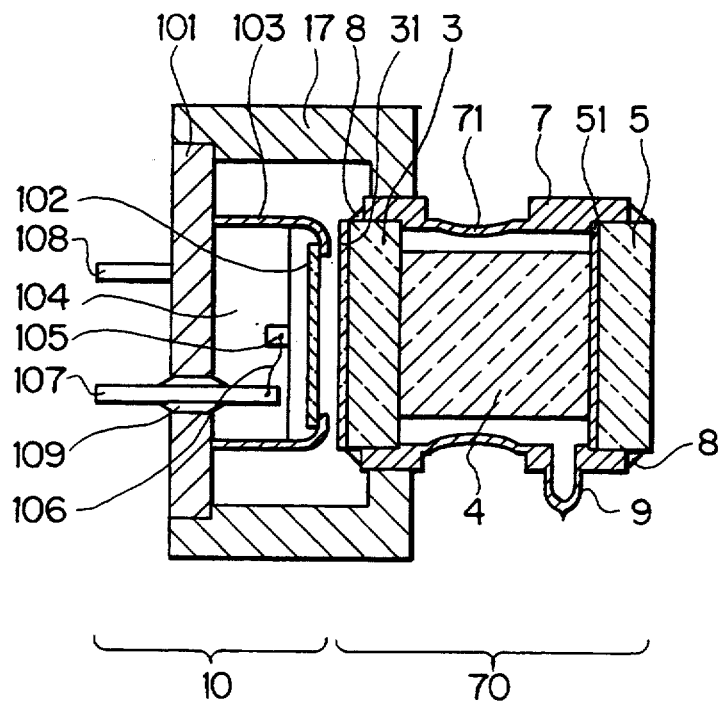
FIG. 1 is a cross section of a first embodiment of the present invention.
Figure 2:
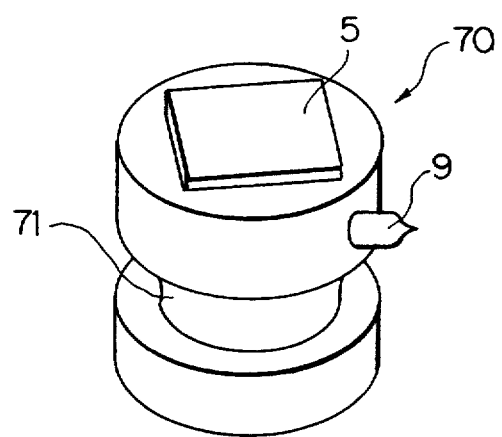
FIG. 2 is a perspective view of a laser resonator unit shown in FIG. 1.

Referring to FIGS. 1 and 2, a hollow member or a metal envelope 7 has a thin-wall portion 71 in a center portion thereof. The thin-wall center portion 71 may be provided by forming an annular groove on an outer peripheral surface of the envelope 7. A laser medium 3 is inserted into one of opening portions of the envelope 7 and air-tightly sealed by using adhesive resin 8. A non-linear optical crystal 4 and an output mirror 5 having a reflective coating 51 thereon are inserted into the envelope 7 in the order from the other opening portion thereof and air-tightly sealed by using the adhesive resin 8. An exhausting pipe 9 is provided in the vicinity of the thin-walled portion 71 in the form of the annular groove and communicates to an interior of the envelope 7. By evacuating the interior of the envelope 7 through the pipe 9, the thin-walled portion 71 is deformed such that opposite end faces of the non-linear optical crystal 4 are brought into intimate contact with and fixed to the laser medium 3 and the output mirror 5, respectively. By suitably sealing the pipe 9 after the evacuation, an air-tight laser resonator unit 70 is obtained. A laser diode unit 10 is fixedly connected to the resonator unit 70 on the side of the laser medium 3 by using a connecting member 17 as a light source for exciting the laser resonator unit 70. The laser diode unit 10 comprises a base substrate 101 and a cap member 103 attached with a window member 102 for a air-tight package. A laser diode 105 is mounted on a heat-sink member 104 within the package. A drive voltage is applied to the laser diode 105 through a bonding wire 106 and a pair of terminals 107 and 108 to produce laser output light from the laser diode 105. The output light from the laser diode unit 10 is directed to the laser medium 3, and absorbed therein to emit a light having a fundamental wavelength. Then the fundamental light is amplified by the laser resonator unit 70 and a second harmonic output light is emitted from the output mirror 5 through the non-linear optical crystal 4.

The reflective coating 31 of the laser medium 3 has high transmittivity against light emitted from the laser diode and high reflectivity against the light excited by the laser medium 3 and second harmonic obtained by the non-linear optical crystal 4 and is formed on one surface of the laser medium 3 in a manner well-known to those of ordinary skill in the art. The reflective coating 51 of the output mirror 5 has a high reflectively of 99.8% or more against the fundamental wavelength and transmittivity of 80% or more against the second harmonic and is formed such that the second harmonic output light can be obtained from output mirror 5 of the laser resonator unit 70.

The solid state laser excited by the laser diode constructed as mentioned above does not require a condenser lens since the laser diode unit 10 and the laser medium 3 are arranged closely to each other. Further, due to the fact that the laser medium 3, the non-linear optical crystal 4 and the output mirror 5 are in intimate contact with each other, it is possible to make the length of the resonator short and an alignment of optical parts becomes unnecessary.

The envelope 7 is preferably of a material having high heat conductivity in order to efficiently radiate heat generated in the laser medium 3 and deformable at the thin-walled portion 71. In these view points, metal such as copper or aluminum is preferable. In case of the envelope 7 is made of copper, the wall thickness of the thin-walled portion 71 is preferably in a range from 0.1 mm to 0.2 mm. As the adhesive resin 8, TORRSEAL ® of Varian Co. may be used. Further, it is preferable to provide steps in an inner wall of the opposite opening portions of the envelope 7, as shown, in order to facilitate the insertion and fixing of the laser medium 3 and the output mirror 5, respectively. In the shown embodiment, the steps are formed by making an inner diameter of the opposite end portions of the envelope 7 larger than that of the center portion. An axial length of the center portion is slightly larger than a length of the non-linear optical crystal 4 in its optical axis direction, the difference of length being determined such that the length of the center portion of the envelope 7 becomes equal to that of ther non-linear optical crystal 4 when the thin-walled portion 71 is deformed by evacuation.

An assembling order of these parts is not critical. However, it is preferable, in view of simplification of assembling procedure, to preliminarily fix the non-linear optical crystal 4 to one of the laser medium 3 and the output mirror 5 temporarily and assemble it to the other. A position of the exhausting pipe 9 is any of the smaller inner diameter portion of the envelope 7. In view of heat radiation effect, it is preferable to make the size of the opening portion of the envelope 7 in which the laser medium 3 is received equal to an outer shape of the laser medium 3.

Although, in the shown embodiment, the groove is formed in the outer wall surface of the envelope 7, it is possible to form it in the inner wall thereof. It is preferable, in view of coupling efficiency, to arrange the laser light emitting surface of the laser diode unit 10 as close to the reflective coating 31 of the laser medium 3 as possible. Further, it is possible to put the evacuated laser resonator unit 70 in an air-tight container filled with inert gas. Further, it is possible to provide cooling fins on the outer surface of the resonator unit 70 or the connecting member 17 to thereby improve the cooling efficiency.

An operation of the present invention will be described with reference to a case where the laser diode 105 is made of GaAs/GaAlAs system. Laser light having wavelength of 810 nm emitted from the laser diode 105 is directed to the reflective coating 31 of the laser medium 3. When the laser medium 3 is Nd:YVO$_4$, the laser medium 3 absorbs this laser light and is excited thereby to generate light having wavelength of 1.06 μm. This light is amplified within the laser resonator constituted with the reflective coating 31 of the laser medium 3 and the reflective coating 51 of the output mirror 5. Since the non-linear optical crystal 4 such as PCNB or DAN is arranged within the laser resonator, the light having wavelength of 1.06 μm is converted into second harmonic by the non-linear optical crystal 4, so that visible light having wavelength of 532 nm is emitted from the output mirror 5. The reflective coating 31 of the laser medium 3 has high transmittivity (90%) against the laser light having wavelength of 810 nm and the reflective coating 51 of the output mirror 5 has low transmittivity (0.2% or less) against light having wavelength of 1.06 μm. As an example, each of the laser medium 3 and the output mirror 5 has a pair of parallel principal surfaces of 4 mm×4 mm in square and axial length, that is, thickness of 1 mm. As an example, the non-linear optical crystal 4 has a pair of parallel principal surfaces of 3 mm×3 mm in square and axial length, that is, thickness of 5 mm. It is preferable, in order to avoid degradation of coupling efficiency, that a distance between the emitting surface of the laser diode 105 and the reflective coating 31 of the laser medium 3 is 3 mm or less.

As described above, since the non-linear optical crystal 4 is air-tightly sealed with in the laser resonator unit 70 and the laser medium 3 is integrated in the high heat conductivity envelope 7, heat generated in the laser medium 3 is radiated through the envelope 7 and heat generated in the non-linear optical crystal 4 is also radiated through the laser medium 3 and the hollow member 7. Therefore, degradation of laser oscillation efficiency can be restricted. Further, since the non-linear optical crystal 4 is sealed against atmosphere, its long life-time is guaranteed and thus an easy-to-handle solid state laser excited by a laser diode is achieved.

What is claimed is:

1. A solid state laser excited by a laser diode comprising: a hollow member, an output mirror air-tightly sealing one end of said hollow member, a laser medium air-tightly sealing the other end of said hollow member for constituting an optical resonator together with said output mirror, a non-linear optical crystal arranged such that it is brought into intimate contact with both of said output mirror and said laser medium by deforming a center portion of said hollow member, and a laser diode disposed on the side of said laser medium opposite to said non-linear optical crystal.

2. A solid state laser claimed in claim 1, wherein said hollow member is provided with an exhausting pipe through which an interior of said hollow member is exhausted.

3. A solid state laser claimed in claim 2, wherein said hollow member is formed with a thin-walled portion which is deformed by the exhaustion.

4. A solid state laser claimed in claim 1, wherein said hollow member is filled with inert gas.

5. A solid state laser claimed in claim 3, wherein said thin-walled portion of said hollow member is provided by forming a groove in an outer wall thereof.

6. A solid state laser claimed in claim 1, wherein said hollow member is of a metal material having good heat conductivity.

7. A solid state laser claimed in claim 1, wherein said laser medium and said output mirror are coupled with said hollow member by an adhesive resin.

8. A solid state laser claimed in claim 1, wherein reflective coatings are provided on a surface of said output mirror in contact with said non-linear optical crystal and a surface of said laser medium opposite to said non-linear optical crystal, respectively.

9. A solid state laser claimed in claim 1, wherein said laser diode and said hollow member are integrated through a connecting member.

10. A solid state laser excited by a laser diode comprising: an optical resonator having a metal hollow member, an output mirror air-tightly sealing one end of said hollow member with adhesive and a laser medium air-tightly sealing the other end of said hollow member, said hollow member having a thin-walled portion, said thin-walled portion being deformed by exhausting an interior of said optical resonator so that a non-linear optical crystal arranged between said output mirror and said laser medium is brought into intimate contact with both of said output mirror and said laser medium, said hollow member being integrated with a laser diode light source unit arranged on the side of said laser medium opposite to said non-linear optical crystal, through a connecting member.

* * * * *